Patented May 2, 1939

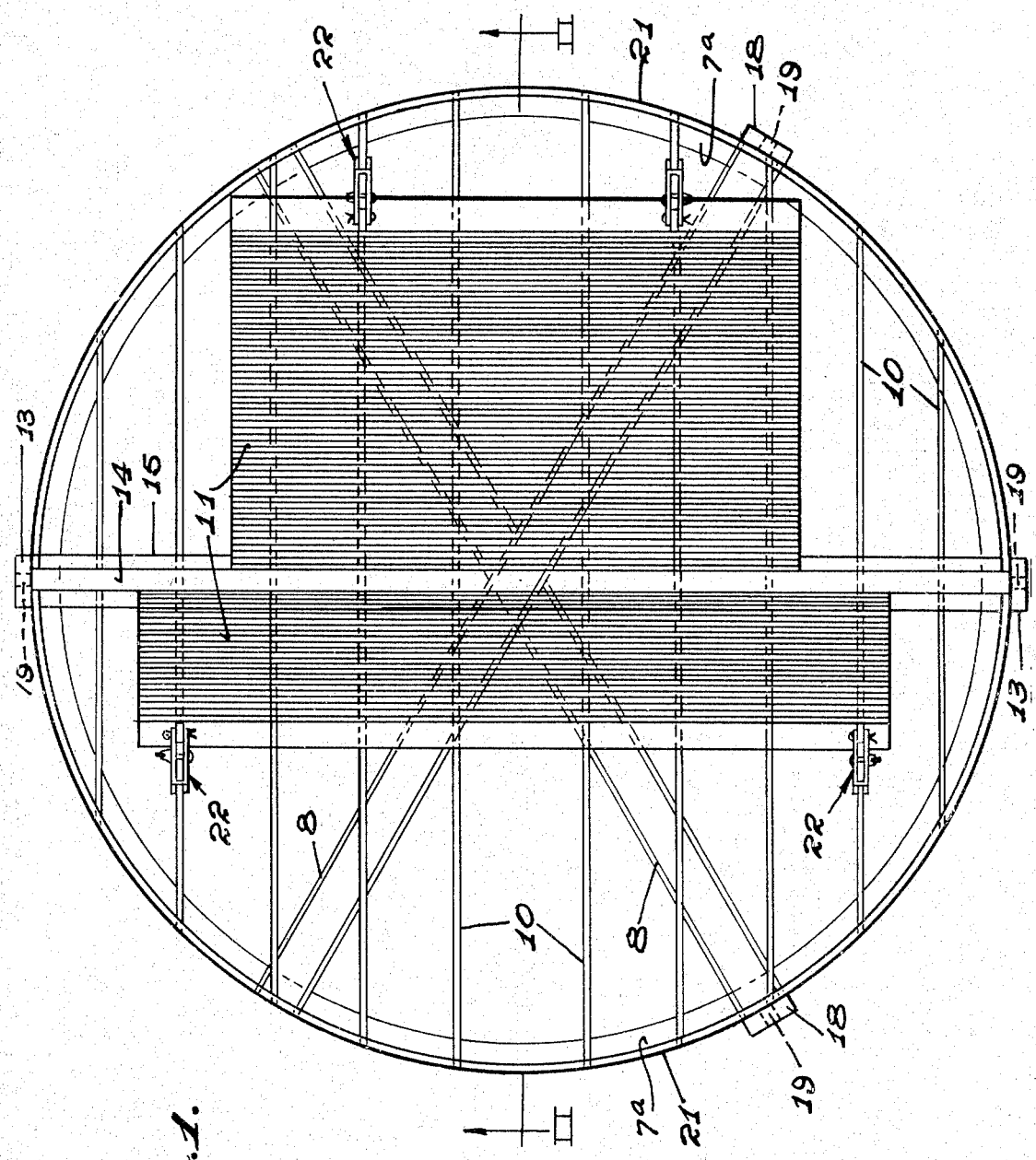

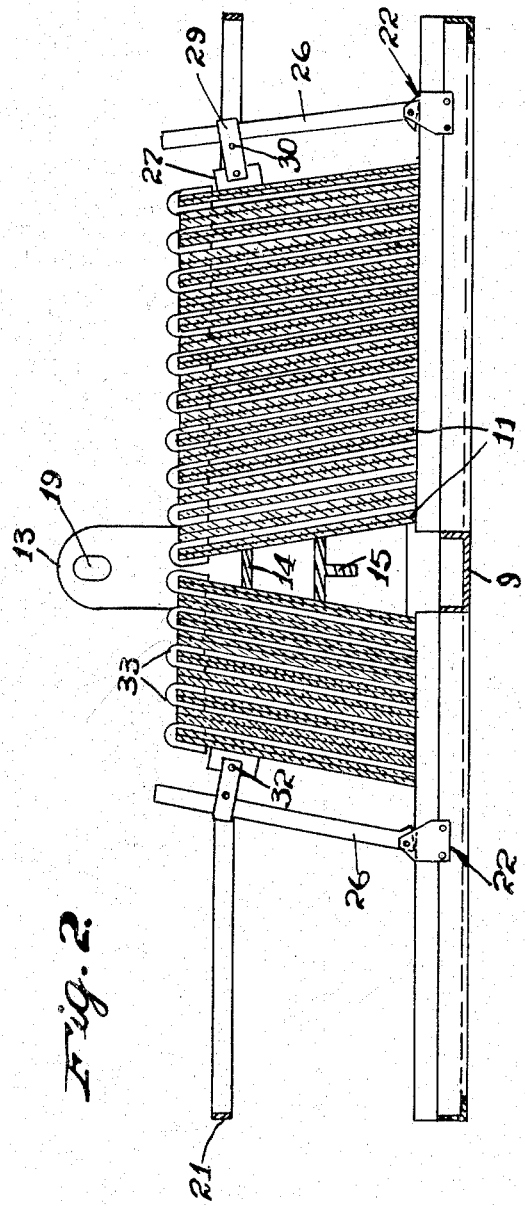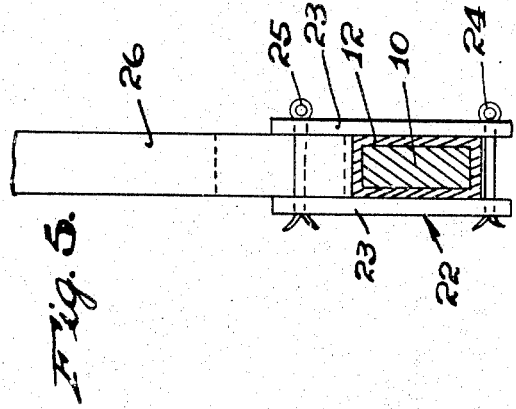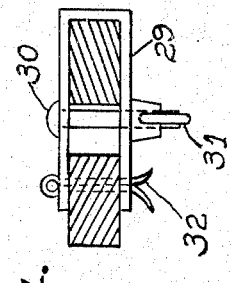

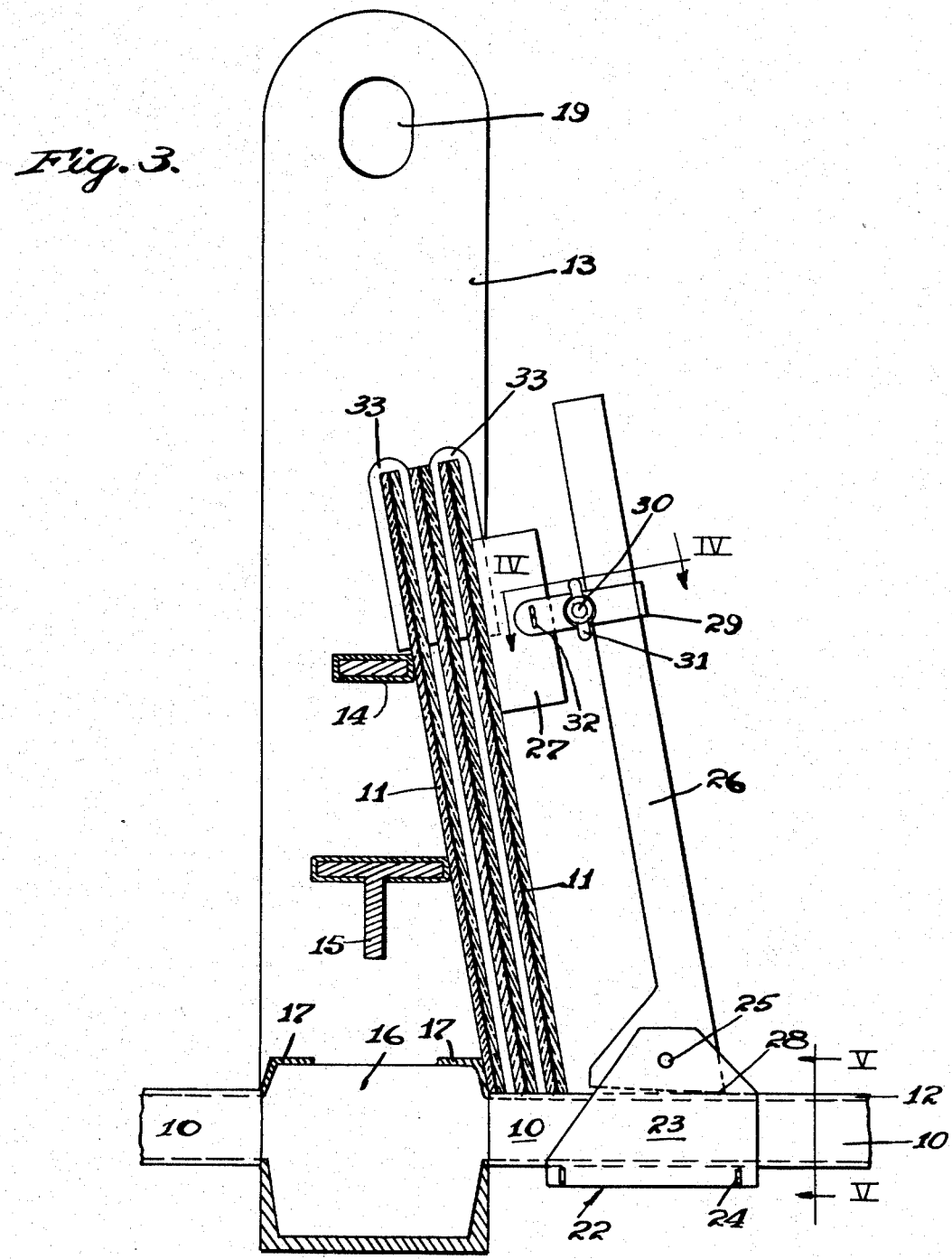

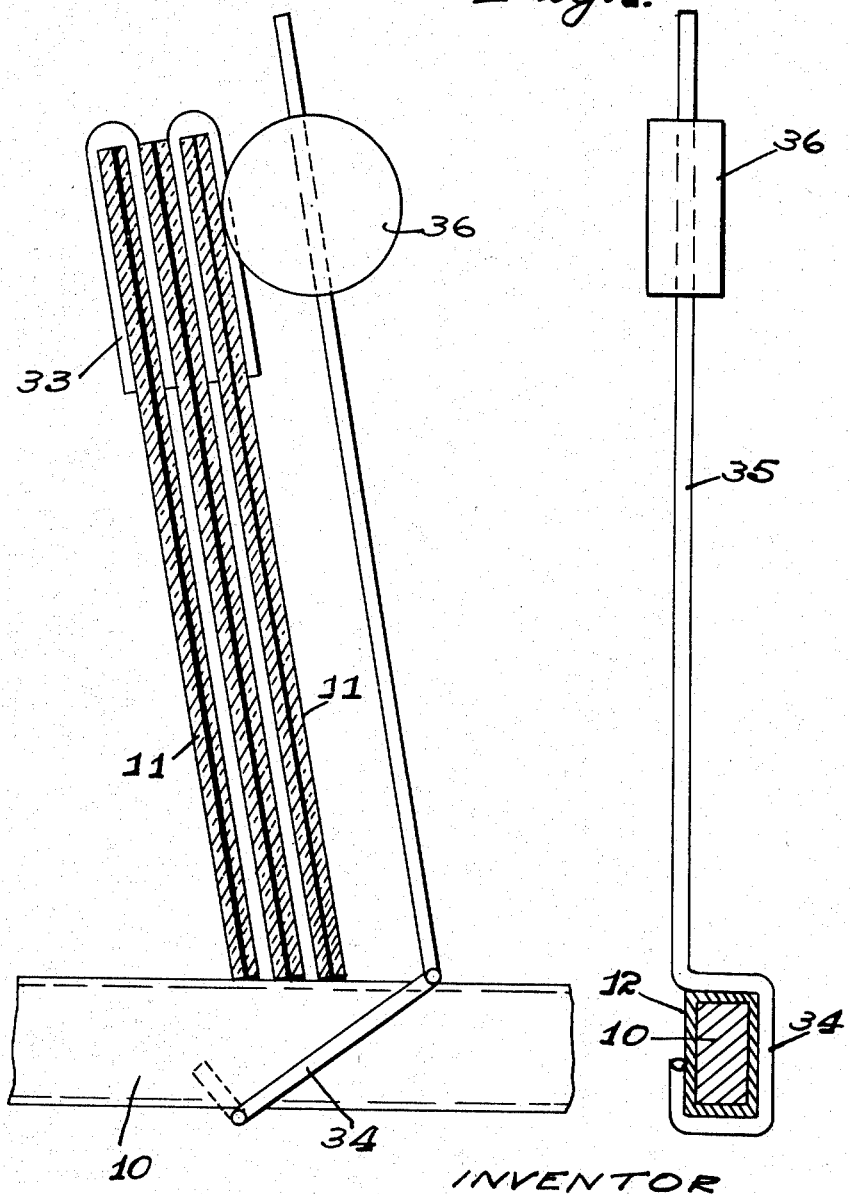

2,156,876

UNITED STATES PATENT OFFICE 2,156,876

SAFETY-GLASS RACK

R. D. Russell Scull, Festus, Mo., assignor to Pittsburgh Plate Glass Company, Allegheny County, Pa., a corporation of Pennsylvania Application October 9, 1937, Serial No. 168,263
Renewed March 14, 1939

2 Claims. (Cl. 294—67)

The invention relates to racks for safety glass. After safety glass employing cellulose acetate or cellulose nitrate is composited, it is customary, in fluid pressing operations, to stack the plates upon racks and lower the racks into an autoclave. The present invention has for its object the provision of an improved rack for supporting the glass sheets in carrying out this operation, or any similar operation, such as acid grooving, in which it is desirable to hold a stack of glass sheets securely in an inclined position for shifting about. A further object is the provision of cheap, simple means adapted to clamp stacks of varying quantity in inclined or upright position which is applicable and releasable in a minimum of time and which may be used to advantage with plates of all sizes. Certain embodiments of the invention are illustrated in the accompanying drawings, wherein:

Figure 1 is a plan view of a loaded rack. Fig. 2 is a section on the line II—II of Fig. 1. Fig. 3 is a partial section similar to Fig. 2, but on a larger scale. Figs. 4 and 5 are detail sections on the lines IV—IV and V—V of Fig. 3, and Figs. 6 and 7 are detail views showing a modified form of clamping means, Fig. 6 being a side elevation and Fig. 7 a front elevation partly in section.

The base of the rack is made up of the annular angle 7a, the cross stiffening channels 8, 8 and 9, and the parallel bars 10, 10, etc., the channels and bars being welded or bolted at their ends to the angle 7a so as to provide a rigid structure of skeleton form. The bars 10, 10, 10 act as the supports for the glass plates 11 which form a stack thereon and to reduce the danger of chipping where the glass engages the bars, such bars are provided with a lead sheathing 12 (Fig. 5).

At the ends of the channel 9 are welded a pair of upright strips 13, 13 which are tied together by the lead sheathed bar members 14 and 15 (Fig. 3) which act as supports for the pack of sheets 11, which rest on the bars 10 and are inclined somewhat to the perpendicular, as indicated in the drawings. Stop members 16 (Fig. 3) carried by the bars and provided with lead sheathing 17 act as positioning means for the lower edges of the glass sheets. Two other uprights 18, 18 (Fig. 1) similar to the strips 13, 13 are provided at the ends of the channels 8, 8. The upper ends of all of the uprights are provided with openings 19 (Fig. 3) and in transporting the rack by means of an overhead crane, three of such openings are utilized to receive the hooks on the overhead crane tackle. The rack is also provided with an annular guard band 21 spaced above the base and welded or bolted to the uprights 13, 13 and 18, 18.

The clamping means for the stacks of glass sheets, which may be placed on both sides of the bar members 14 and 15, each include a shoe 22 formed of a pair of plates 23, 23 secured together by cotters 24, 24 and 25. The cotter 25 acts as a pivot for an upright arm 26 carrying at its upper end a block 27 adapted to engage the face of the outer plate of the pack. The shoe will ride freely on the bar 10 in moving the assembly to the left (Fig. 4) to bring it to clamping position. Pressure to the right applied at the upper end of the arm 26, however, will cause a clamping action at the shoe preventing its movement to the right. This locking action is due to the corner 28 of the arm engaging the top of the bar 10 as the arm swings on its pivot 25 in a clockwise direction. The device, therefore, automatically locks in the position to which it is moved on the bar 10. To release the clamp, the shoe itself is grasped and pulled to the right, a slight pressure being at the same time applied to the left at the upper end of the bar 26.

In order to adopt the device to plates of varying width, the mounting of the block 27 is made adjustable longitudinally of the bar 26. The mounting consists of a U-strap 29 (Fig. 4) whose sides are clamped against the sides of the bar 26 by a bolt 30 provided with a wing nut 31, the ends of the strap being secured to the block 27 by the cotter 32. In order to space the plates 11 at their upper edges, lead wire spacers 33 are provided, as indicated in Fig. 3. Two clamping devices are ordinarily used with a pack of sheets, but it will be understood that the number may be varied depending on the size of the sheets and that any of the bars 10 may be utilized to carry the shoes.

Figs. 6 and 7 illustrate a modified means for clamping the glass sheets. In this case the shoe 34 and arm 36 are formed in one piece from spring wire, and the glass engaging member 36 of wood or the like is slidably mounted on the arm, so that it may be adjusted to suit requirements. The functioning and operation of the device is similar to that of Figs. 1 to 5, the shoe locking against movement to the right in any position to which it may be adjusted on the arm.

What I claim is:

1. In combination in a glass rack, a skeleton base including parallel bars of rectangular cross section for supporting the lower edges of a pack of glass plates, upright supporting means carried by the base and lying thereabove for engaging the side face of one of the plates of the stack for maintaining the stack in upright position inclined somewhat from the perpendicular, a shoe slidably mounted on one of the bars and comprising a pair of parallel side plates, a pivot pin between the plates above the bar, and a pair of spaced releasable tie members securing the plates together beneath the bar, and a clamping arm on said pivot pin provided with means on its upper portion for engaging the plates of the stack on the side thereof remote from the supporting means and provided at its lower end to the rear of said pivot with a toe portion positioned to engage the top of the bar and clamp the shoe against movement on the application of pressure to the upper portion of the arm tending to move it away from the pack.

2. In combination in a glass rack, a skeleton base including parallel bars of rectangular cross section for supporting the lower edges of a pack of glass plates, upright supporting means carried by the base and lying thereabove for engaging the side face of one of the plates of the stack for maintaining the stack in upright position inclined somewhat from the perpendicular, a shoe slidably mounted on one of the bars and comprising a pair of parallel side plates, a pivot pin mounted releasably in the plates above the bar, and a pair of spaced tie members securing the plates together beneath the bar, and a clamping arm on said pivot pin provided with means on its upper portion for engaging the plates of the stack on the side thereof remote from the supporting means and provided at its lower end to the rear of said pivot with a toe portion positioned to engage the top of the bar and clamp the shoe against movement on the application of pressure to the upper portion of the arm tending to move it away from the pack.

R. D. RUSSELL SCULL.